United States Patent
Fujii et al.

(10) Patent No.: US 12,067,352 B2
(45) Date of Patent: Aug. 20, 2024

(54) NON-TRANSITORY COMPUTER READABLE MEDIUM WITH EXECUTABLE REVISION HISTORY INTEGRATION PROGRAM CONVERTING NAME OF AN EDITOR IN A REVISION HISTORY OF A DOCUMENT AND SUBSEQUENTLY DELETING ADDITION AND DELETION HISTORIES IN THE SAME EDITOR'S NAME RESULTING FROM THE CONVERSION, AND REVISION HISTORY INTEGRATION SYSTEM WITH SERVER THAT PERFORMS THE SAME CONVERSIONS AND DELETIONS

(71) Applicant: BoostDraft, Inc., Tokyo (JP)

(72) Inventors: Yohei Fujii, Tokyo (JP); Hiroshi Watanabe, Tokyo (JP)

(73) Assignee: BOOSTDRAFT, INC., Tokyo (JP)

( * ) Notice: Subject to any disclaimer, the term of this patent is extended or adjusted under 35 U.S.C. 154(b) by 0 days.

(21) Appl. No.: 17/813,474

(22) Filed: Jul. 19, 2022

(65) Prior Publication Data

US 2023/0024851 A1    Jan. 26, 2023

(30) Foreign Application Priority Data

Jul. 19, 2021    (JP) ................................ 2021-119104

(51) Int. Cl.
*G06F 40/166* (2020.01)
*G06F 16/21* (2019.01)

(52) U.S. Cl.
CPC .......... *G06F 40/166* (2020.01); *G06F 16/219* (2019.01)

(58) Field of Classification Search
CPC .... G06F 40/166; G06F 16/219; G06F 40/197; G06F 16/93; G06Q 10/101; G06Q 10/103
See application file for complete search history.

(56) References Cited

U.S. PATENT DOCUMENTS

| | | | |
|---|---|---|---|
| 8,510,304 B1* | 8/2013 | Briggs | G06F 16/22 707/742 |
| 10,127,212 B1* | 11/2018 | Kim | G06F 40/16 |
| 2010/0083136 A1* | 4/2010 | Komine | G06F 9/52 715/255 |

(Continued)

FOREIGN PATENT DOCUMENTS

| | | |
|---|---|---|
| JP | H11-306173 A | 11/1999 |
| JP | 2007-004734 A | 1/2007 |
| JP | 2010-097324 A | 4/2010 |

OTHER PUBLICATIONS

Japanese Office Action, date of drafting Mar. 11, 2022, from Priority Application JP 2021-119104 A.

*Primary Examiner* — Rami R Okasha
(74) *Attorney, Agent, or Firm* — GREENBLUM & BERNSTEIN, P.L.C.

(57) ABSTRACT

A non-transitory computer readable medium with an executable revision history integration program for causing at least one computer executes: a procedure for acquiring data on at least one document having at least one editing history including a name of an editor of the document; a procedure for collectively converting at least one name of an editor included in the editing history in the acquired data; and a procedure for deleting addition and deletion histories where a character string in the acquired data has been added and deleted by the same editor's name, as a result of the conversion of the name of the editor.

6 Claims, 4 Drawing Sheets

(56) References Cited

U.S. PATENT DOCUMENTS

| | | | | |
|---|---|---|---|---|
| 2012/0110445 A1* | 5/2012 | Greenspan | ............ | G06F 40/169 |
| | | | | 715/256 |
| 2013/0262373 A1* | 10/2013 | Rampson | .............. | G06F 40/197 |
| | | | | 707/E17.008 |
| 2013/0275369 A1* | 10/2013 | Hajare | .................. | G06F 16/215 |
| | | | | 707/E17.005 |
| 2013/0326330 A1* | 12/2013 | Harris | .................... | G06F 40/197 |
| | | | | 715/234 |
| 2014/0149857 A1* | 5/2014 | Vagell | ................. | G06F 40/169 |
| | | | | 715/255 |
| 2014/0281872 A1* | 9/2014 | Glover | .................. | G06F 40/197 |
| | | | | 715/229 |
| 2015/0006581 A1* | 1/2015 | Luo | ......................... | G06F 16/14 |
| | | | | 707/783 |
| 2015/0032828 A1* | 1/2015 | Ordogh | .................. | H04W 4/00 |
| | | | | 709/206 |
| 2015/0193521 A1* | 7/2015 | Schoeffler | ............ | G06Q 10/103 |
| | | | | 707/737 |
| 2015/0199411 A1* | 7/2015 | Greenspan | .............. | G06F 16/93 |
| | | | | 715/764 |
| 2016/0299916 A1* | 10/2016 | Prasanna | ............. | G06F 16/2365 |
| 2017/0053244 A1* | 2/2017 | Khalil | ................ | G06Q 10/1097 |
| 2017/0228393 A1* | 8/2017 | Fay | ....................... | G06F 40/166 |
| 2017/0364573 A1* | 12/2017 | Kapadia | .................. | G06F 16/27 |
| 2018/0144095 A1* | 5/2018 | Fellowes | ................ | G16H 10/60 |
| 2019/0079912 A1* | 3/2019 | Siwoff | .................. | G06F 40/137 |
| 2019/0278839 A1* | 9/2019 | Codrington | ......... | G06F 16/2282 |

* cited by examiner

NON-TRANSITORY COMPUTER READABLE MEDIUM WITH EXECUTABLE REVISION HISTORY INTEGRATION PROGRAM CONVERTING NAME OF AN EDITOR IN A REVISION HISTORY OF A DOCUMENT AND SUBSEQUENTLY DELETING ADDITION AND DELETION HISTORIES IN THE SAME EDITOR'S NAME RESULTING FROM THE CONVERSION, AND REVISION HISTORY INTEGRATION SYSTEM WITH SERVER THAT PERFORMS THE SAME CONVERSIONS AND DELETIONS

CROSS REFERENCE TO RELATED APPLICATIONS

This application claims the benefit of Japanese Patent Application No. 2021-119104 filed on Jul. 19, 2021, the disclosure of which is incorporated herein by reference.

BACKGROUND OF THE INVENTION

1. Field of the Invention

The present invention relates to a non-transitory computer readable medium with an executable revision history integration program, and a revision history integration system.

2. Description of the Related Art

There have been many cases in which a plurality of operators work on editing one same piece of electronic data using word processors or word processing software.

Japanese Laid-Open Patent Application, Publication No. 2005-197823 (to be referred to as Patent Document 1 hereinafter) discloses that "To make cooperation by automatically providing related operators with information on document alteration by a 3rd party and browsing, browsing recognition, etc., of an altered document and an operation state when the operators edit a shared document (Abstract)".

RELATED ART DOCUMENT

Patent Document

[Patent Document 1] Japanese Laid-Open Patent Application, Publication No. H11-306173

SUMMARY OF THE INVENTION

When a document is edited and editing histories are recorded to data on the document, information on how and by who the document is edited, such as an addition and a deletion, is added to the document data for each of the editing histories. In some cases, one and the same person may edit the document mistakenly in plural different editor names. For example, a document should have been edited in the name of a company, but was also done in the name of a person in the company. Or, a document should have been edited in one and the same name in a company, but was actually done in the names of plural persons in the company. In some cases, information on editing histories which should have been made in the name of one and the same editor is inappropriately added to document data in the name of plural different names. In order to correct the information, it is necessary to delete one or more editing histories in an incorrect name or names and to perform re-editing in a correct name, which takes time and trouble.

In light of the above, the present invention has been made in an attempt to suitably integrate a plurality of editing histories in data on a document and simplify a plurality of the editing histories in the document data.

In the present invention, a non-transitory computer readable medium with an executable revision history integration program for causing at least one computer to execute: a procedure for acquiring data on at least one document having at least one editing history including a name of an editor of the document; a procedure for collectively converting at least one name of an editor included in the editing history in the acquired data; and a procedure for deleting addition and deletion histories where a character string in the acquired data has been added and deleted by the same editor's name, as a result of the conversion of the name of the editor.

In the present invention, a revision history integration system includes: a server that includes an acquiring part configured to acquire data on at least one document having at least one editing history including a name of an editor of the document, an editor's name convert part configured to collectively convert at least one name of an editor included in the editing history in the acquired data, and a deletion part configured to delete addition and deletion histories where a character string in the acquired data has been added and deleted by the same editor's name, as a result of the conversion of the name of the editor; and a terminal that includes a connectivity add-in for connecting to the server.

In the present invention, a revision history integration system, includes: a server that includes an acquiring part configured to acquire data on at least one document having at least one editing history including a name of an editor of the document, an editor's name convert part configured to collectively convert at least one name of an editor included in the editing history in the acquired data, and a deletion part configured to delete addition and deletion histories where a character string in the acquired data has been added and deleted by the same editor's name, as a result of the conversion of the name of the editor; and a terminal that includes a browser having a function of making an appropriate data displayed in a display part and is connected to the server.

The present invention can suitably integrate a plurality of editing histories in data on a document and simplify a plurality of the editing histories in the document data.

DETAILED DESCRIPTION OF THE EMBODIMENTS

Embodiments of the present invention are described next in detail. The embodiments described below are given as examples for achieving the present invention and are appropriately changed or modified according to structures of devices to be used or other various conditions. The present invention is not limited to those embodiments.
[Entire Structure of Computer]

Figure 1:
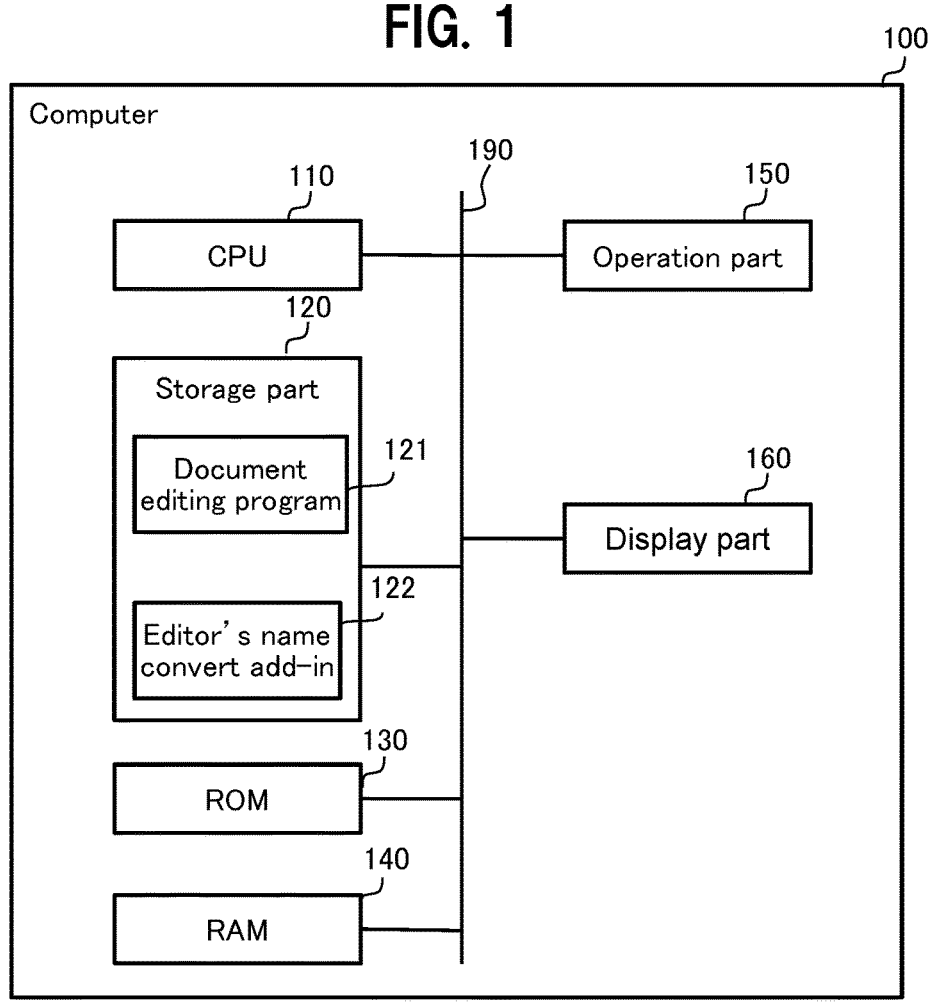
FIG. 1 is a diagram for explaining a main structure of a computer according to an embodiment of the present invention.

FIG. 1 is a diagram for explaining a main structure of a computer 100 according to an embodiment of the present invention.

The computer 100 is, for example, a computer that serves as a document preparation assistance device (a word processor) or a document viewing assistance device (a viewer). Such a document preparation assistance device has a function of document viewing assistance. In the explanation below, the same reference numerals are given to the same components and description thereof is omitted herefrom where appropriate.

The computer 100 includes a CPU (Central Processing Unit) 110, a storage part 120, a ROM (Read Only Memory) 130, a RAM (Random Access Memory) 140, an operation part 150, and a display part 160.

The CPU 110 is a central processor that: executes a document editing program 121 stored in the storage part 120 or the ROM 130; and also executes an editor's name convert add-in 122.

The document editing program 121 is a program for, when executed by the CPU 110 of the computer 100, performing a procedure of assisting preparation of a document or a procedure of subjecting the document to editing. The editor's name convert add-in 122 is an add-in program that, when the document editing program 121 is being activated, adds a function of changing a name of a editor. Note that the editor's name convert add-in 122 is a program of modifying a revision history with a function of changing an editor's name and is also a program of integrating revision histories with a function of appropriately integrating a plurality of names of editors. Note that the function of changing an editor's name or appropriately integrating a plurality of names of editors can be implemented in any appropriate means other than such an add-in program.

Figure 2:
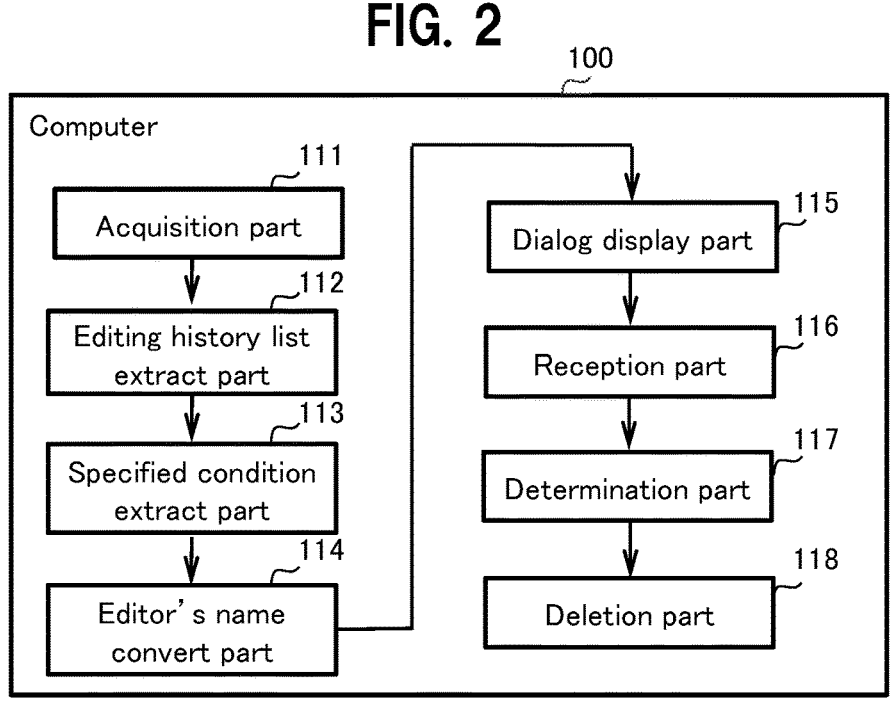
FIG. 2 is a functional block diagram illustrating functions of the computer according to the embodiment.

By executing the editor's name convert add-in 122, the CPU 110 realizes an acquisition part 111, an editing history list extract part 112, a specified condition extract part 113, an editor's name convert part 114, a dialog display part 115, a reception part 116, a determination part 117, and a deletion part 118, as illustrated in FIG. 2. Respective processings performed by the CPU 110 will be described in detail hereinafter with reference to FIG. 2.

The storage part 120 is a large-capacity storage and is realized by, for example, such as a hard disk drive and a non-volatile memory. The storage part 120 stores therein, for example, the document editing program 121 and the editor's name convert add-in 122.

The RAM 140 serves as a work area that temporarily stores therein various types of programs, inputted data, output data, parameters, and the like which are read out from the storage part 120 or the ROM 130 and are executable by the CPU 110, in various processings performed and controlled by the CPU 110.

The operation part 150 includes: a keyboard having a cursor key, a numerical input key, a function key of various types, or the like: and a pointing device such as a mouse. The operation part 150 outputs a press signal generated by pressing a key on the keyboard or an operation signal generated by operating the mouse, each as an input signal to the CPU 110. The CPU 110 performs processings of various types, based on the operation signal or the like from the operation part 150.

The display part 160 includes a monitor display such as, for example, a CRT (Cathode Ray Tube) and a LCD (Liquid Crystal Display). The display part 160 displays various screens in response to signals for display, inputted from the CPU 110. Each of the display part 160 and the operation part 150 may be realized by a touch panel display.

An internal bus 190 is a combination of a plurality of signal lines each connecting the components in the computer 100 therebetween.
[Functional Block of Computer]

Next are described functions performed when the CPU 110 of the computer 100 executes the editor's name convert add-in 122 according to this embodiment, with reference to FIG. 2. Note that the editor's name convert add-in 122 is executed when the document editing program 121 is being activated.

FIG. 2 is a functional block diagram illustrating functions performed by the CPU 110 of the computer 100 according to the embodiment of the present invention. The CPU 110 executes the editor's name convert add-in 122 illustrated in FIG. 1, to thereby realize the acquisition part 111, the editing history list extract part 112, the specified condition extract part 113, the editor's name convert part 114, the dialog display part 115, the reception part 116, the determination part 117, and the deletion part 118.

The acquisition part 111 acquires a document data including an editing history that contains a name of an editor who has edited the document. The acquisition part 111 acquires, for example, a data in XML (Extensible Markup Language) format describing a document. The data in XML format includes an editing history that shows who has made what editing. Note that such an electronic data is not limited to that in XML format and may be in any other appropriate format.

The editing history list extract part 112 extracts a list of editing histories in a range specified by a user, from the document data. The range specified by a user may be the entire document, a range selected by the user, a range selected in a mechanical manner, or the like. The editing history list extract part 112 extracts one or more editing histories contained in the user's specified range.

The specified condition extract part 113 acquires an editing history that satisfies a condition specified by the user. More specifically, in changing an editing history of a document data, the specified condition extract part 113 extracts an editing history that satisfies a condition specified by the user. The condition specified by the user is, for example, a name of an editing history processing before the editing history is changed and a time when the editing was made. In this case, the specified condition extract part 113 specifies, for example, a name of an editing history processing before the editing history is changed; a name of an editor (or a reviewer) before changing the editing history; and a date and a time when the editing was made. The specified condition extract part 113 then extracts an appropriate editing history.

The editor's name convert part 114 collectively converts a name of an editor to be changed in the editing history in the acquired document data, after the editing is finished. How the name of the editor is changed is described hereinafter with reference to FIG. 4.

The dialog display part 115 displays, in a dialog box, a character or a character string differently edited by an addition and a deletion thereof, by editors who are found to be actually one and the same person as a result of an integration of revision histories, though the actually-the-same editor appears in plural different names. More specifically, the dialog display part 115: determines, character by character, a portion at which the actually-the-same editor has edited a plurality of times under different names; and displays, in a dialog box, a character or a character string in the portion differently edited by an addition and a deletion, if any.

In this embodiment, when, for example, a character which has been deleted and is displayed with a strike-through, the deleted character is still referred to as a (one) character. Two or more characters may be referred to as a character string. When a document is edited, an addition or a deletion as editing is, in many cases, made to a character string consisting of a plurality of characters. Regardless of whether a portion edited by an addition and a deletion is made up of a character or a character string, the character or the character string is displayed in a dialog box.

The reception part 116 allows an input of an instruction that two different editing histories made to a same portion be deleted. The reception part 116 is configured to, for example, allow an instruction that two different editing histories made to the same portion be deleted, to be displayed in a dialog box. The instruction that the two different editing histories made to the same portion be deleted will be described hereinafter with reference to FIG. 5.

The determination part 117 determines whether or not deletion of the two incompatible editing histories made to the same portion has been instructed. The determination part 117 determines, for example, in a dialog box display, whether or not deletion of the two different editing histories made to the same portion has been instructed.

The deletion part 118 deletes the two different editing histories by an addition and a deletion made to the same portion, which can clear such incompatible editing operations to the same portion. For example, upon receipt of an instruction of deleting the two different editing histories, from the determination part 117, the deletion part 118 deletes the two editing histories by the addition and the deletion. In this embodiment, this can simplify a plurality of editing histories in data on a document because incompatible editing operations can be appropriately cleared.

[Processing of Integrating Revision Histories]

Next is described a processing of integrating a plurality of revision histories performed by the CPU 110 of the computer 100 according to this embodiment.

Figure 3:
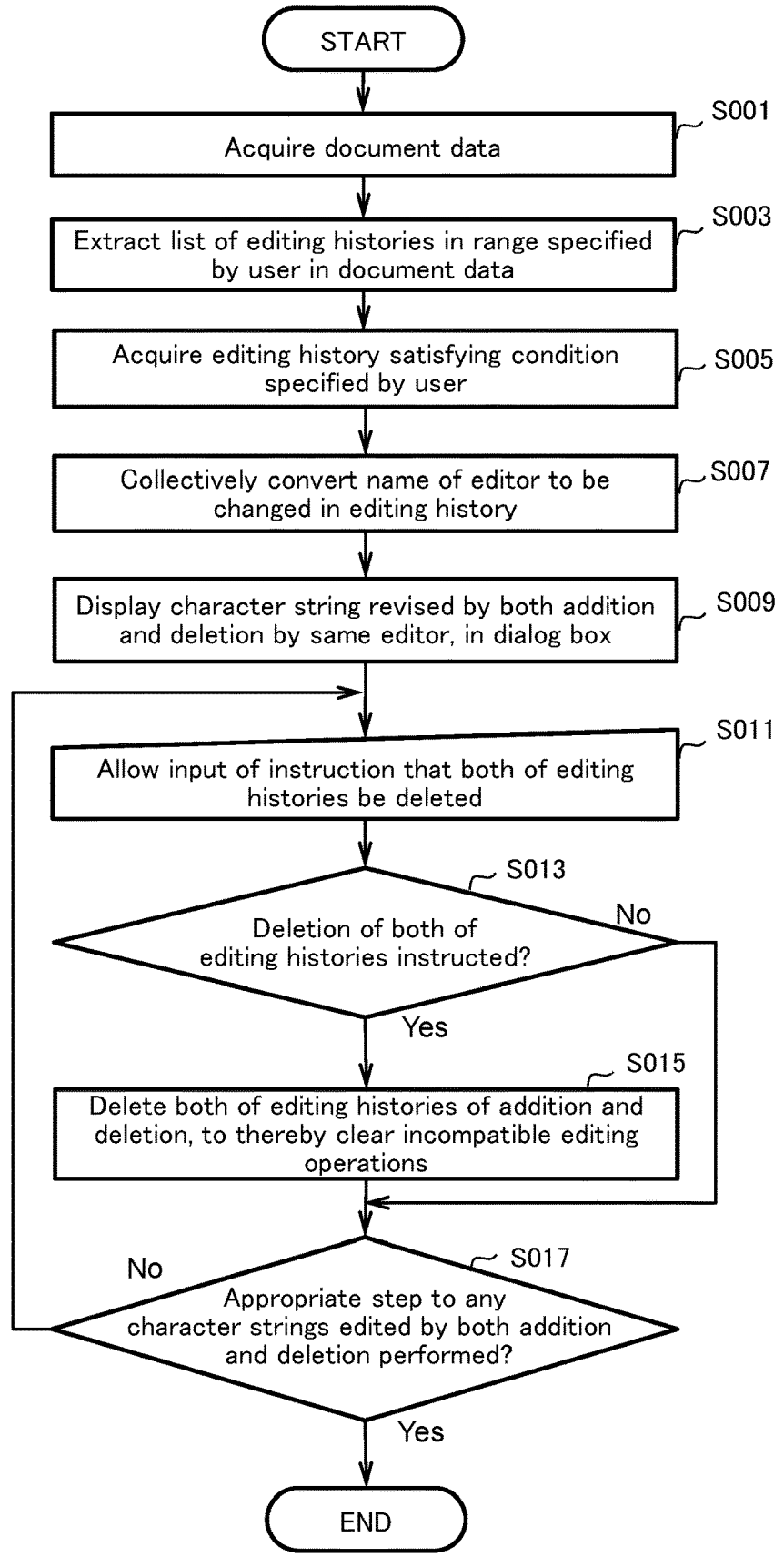
FIG. 3 is a diagram illustrating a flowchart illustrating a processing of integrating revision histories of a document data, performed by a CPU of the computer according to the embodiment.

FIG. 3 is a flowchart illustrating a processing of integrating revision histories in a document data, performed by the CPU 110 of the computer 100 according to this embodiment.

As illustrated in FIG. 3, the CPU 110 of the computer 100: executes the document editing program 121; and then executes the editor's name convert add-in 122, to thereby acquire a document data (step S001). More specifically, the acquisition part 111 of the CPU 110 acquires the document data. Note that the document data: includes a history of an editing, containing a name of an editor who has made the editing; and is stored in, for example, the storage part 120.

The editing history list extract part 112 of the CPU 110 then extracts a list of editing histories in a range specified by a user in the document data (step S003).

The specified condition extract part 113 of the CPU 110 acquires an editing history satisfying a condition specified by the user (step S005). The specified condition extract part 113 acquires a data on the editing history satisfying the condition specified by the user, such as, for example, a name of an editing history before the editing history is changed and a date and a time at which an editing of interest was made.

The editor's name convert part 114 of the CPU 110 collectively converts a name of an editor to be changed in the editing history, after the editing is finished (step S007). More specifically, when a plurality of editing histories each satisfying the condition specified by the user are acquired, the editor's name convert part 114 collectively converts only names of editors specified as those to be changed, after the editing is finished.

It is assumed in this embodiment that the editor's name convert part 114 integrates, in a document data, the names of two different editors which are mistakenly used by one and the same person. One of such examples is that, when a user is supposed to use a name of an organization throughout editing of a document, the user mistakenly uses his/her personal name, too. Another example is that, when a plurality of editors have edited the same file and the resultant edited data is integrated, though the respective editors were supposed to use one and the same name of an organization to which they belong, one or more of the editors mistakenly use respective personal names. In those cases, the CPU 110: changes, for example, a name of the editor from a personal name to an organization name; or integrates revision histories by names of one or more individuals mixed with one or more organizations, into any appropriate name.

Figure 4:
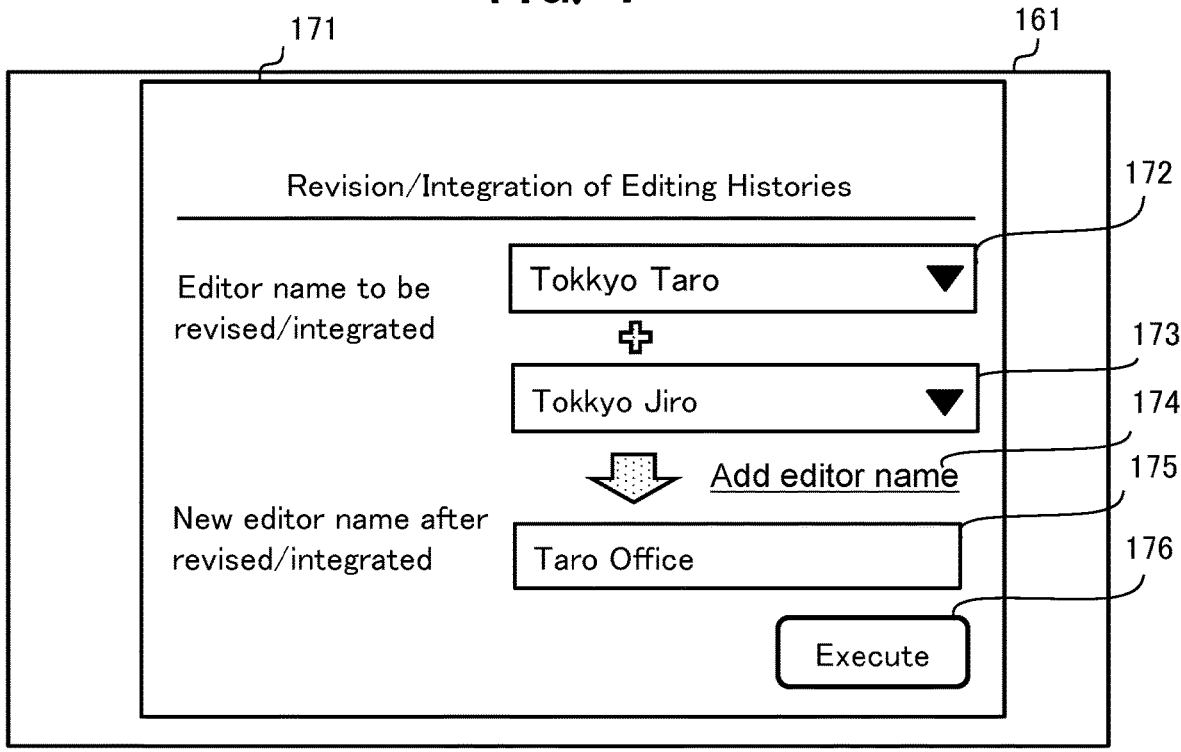
FIG. 4 is a diagram for explaining an example illustrating a display screen when the CPU of the computer makes a display device display names of editors whose revision histories are to be integrated, according to the embodiment.

FIG. 4 is a diagram illustrating an example of a display screen when the CPU 110 of the computer 100 makes the display part 160 display names of editors whose revision histories are to be integrated, according to the embodiment of the present invention.

As illustrated in FIG. 4, a window 171 showing revision/integration of histories appears in a display screen 161 displayed in the display part 160. A name of an editor can be revised to or integrated into another on the window 171.

The window 171 showing revision/integration of histories includes a combo box 172, another combo box 173, an editor's name add link 174, a text box 175, and an execute button 176.

Each of the combo boxes 172, 173 displays a name of an editor who has edited a document data, in a manner selectable from a pull-down menu. For example, "Tokkyo Taro" is selected as a name of the first editor in the combo box 172. "Tokkyo Jiro" is then selected as a name of the second editor in the combo box 173. "Tokkyo Taro" and "Tokkyo Jiro" are extracted from a plurality of editing histories of the document data. It is assumed herein, however, that an editing history of "Tokkyo Taro" and an editing history "Tokkyo Jiro" are actually those of the same person.

The editor's name add link 174 is used when a user wants to select three or more editors. With a click of the editor's name add link 174, a new combo box will appear and a name of the third editor can be selected, and so on.

The text box 175 allows therein an input of a name of an editor to be used after the names of the editors in the editing histories are integrated. The text box 175 allows therein an input of, as an example, "Taro Office" as the name of the editor after the integration.

The execute button 176 is used when an integration of names of editors is executed. In response to a press down of the execute button 176 by a user, the editor's names of "Tokkyo Taro" and "Tokkyo Jiro" in the editing histories are integrated into "Taro Office" inputted in the text box 175. Note that in revising an editor's name in editing histories in the integration, not only either of the two originally-provided editor's names but also any other new name may be selected. Or, one editor's name may be just changed to another.

FIG. 4 illustrates a case in which the names of the two editors are integrated. When a name of one editor is changed to another, for example, from "Tokkyo Taro" to "Taro Office", a user: selects "Tokkyo Taro" in the combo box 172; selects blank in the combo box 173; and inputs "Taro Office" in the text box 175.

Description is made referring back to the flowchart of FIG. 3.

The dialog display part 115 of the CPU 110 displays, in a dialog box, a character string which has been differently revised by both an addition and a deletion by the same editor, as a result of the integration (step S009).

Figure 5:
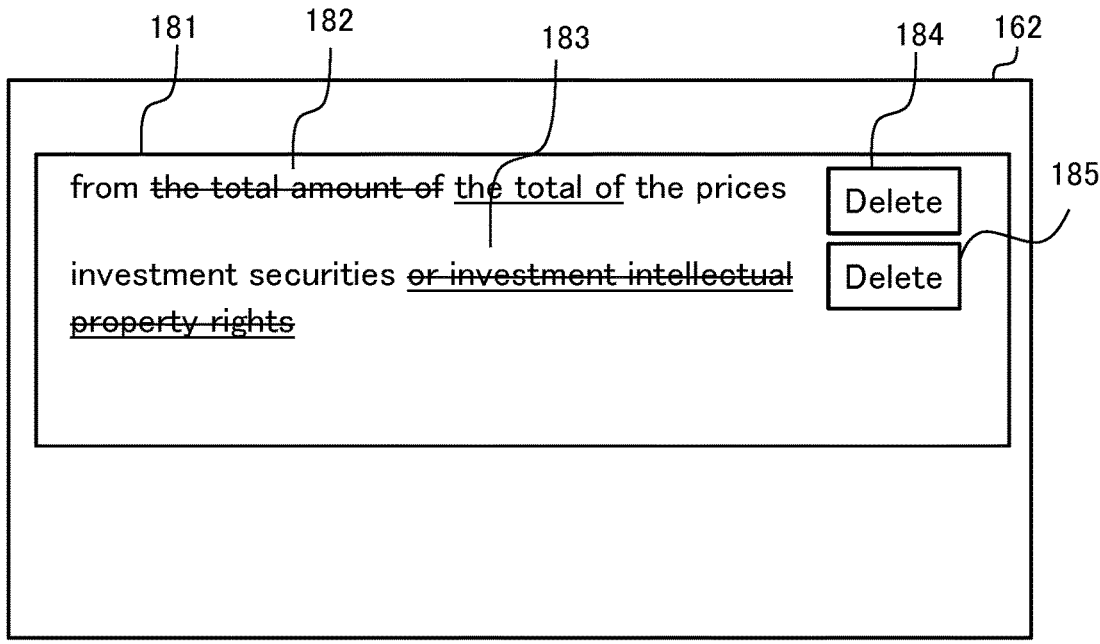
FIG. 5 is a diagram for explaining an example illustrating a display screen when the CPU of the computer makes a display device display, in a dialog box, a character string which has been differently revised by both an addition and a deletion according to the embodiment.

FIG. 5 is a diagram for explaining an example illustrating a display screen when the CPU 110 of the computer 100 makes the display device 160 display, in a dialog box 181, a character string which has been differently revised by an addition and a deletion by an actually-one-and-the-same editor under a plurality of different names, according to the embodiment of the present invention.

As illustrated in FIG. 5, a dialog box 181 is displayed on the display screen 162 displayed in the display part 160.

The dialog box 181: displays character strings 182, 183, to each of which one and the same editor has edited differently by an addition and a deletion; and has delete buttons 184, 185.

In the character string 182, "total amount" is struck through and "total" is underlined. This means that the struck through "total amount" is deleted, and, after the deletion, the underlined "total" is added.

A user presses down the delete button 184 so as to delete the editing histories of the deletion and the addition of the character string 182. By the user's operation, "total" is left unchanged in the character string 182.

In the character string 183, "or investments intellectual property rights" is underlined and is also struck through. This means that both an addition and a deletion are made to the same portion. For example, a user presses down the delete button 185 so as to delete the editing histories of the addition and the deletion of the character string 183. By the user's operation, the entire revised portion of the character string 183 is deleted.

Description is made referring back to the flowchart of FIG. 3.

The reception part 116 of the CPU 110 allows an input of an instruction that the two different editing histories made to the same portion be deleted (step S011).

The determination part 117 of the CPU 110 determines whether or not the deletion of the two editing histories has been instructed (step S013). If the deletion of the two editing histories is determined to have been instructed (Yes in step S013), the deletion part 118 deletes the two editing histories by the addition and the deletion, to thereby clear such incompatible editing operations to the same portion (step S015). The determination part 117 then advances the processing to step S017.

In this case, after the editor's name convert part 114 appropriately changes the name of the editor, the deletion part 118 deletes the two editing histories in the character string, to which the same editor has made different revisions by the addition and the deletion.

For example, when the delete button 184 is clicked, the deletion part 118 deletes the editing histories in the character string 182.

When the delete button 185 is clicked, the deletion part 118 deletes the editing histories in the character string 183.

With the operations described above, the deletion part 118 deletes the two different editing histories, one by the addition and the other by the deletion, made by the same editor, as a result of the integration. This can clear incompatible editing operations to the same portion by the same editor.

In this embodiment, as described above, names of editors of editing histories in data on a document can be appropriately integrated and incompatible editing operations to the same portion by one and the same editor can be cleared. This can simplify a plurality of editing histories in the document data.

In the meantime, if the deletion of the two editing histories is not determined to have been instructed (if No in step S013), the determination part 117 advances the processing to step S017.

In step S017, the determination part 117 determines whether or not an appropriate step has been performed to any character strings, to each of which both an addition and a deletion have been made by the same editor (step S017). If an appropriate step to each of the character strings is not determined to have been performed (No in step S017), the determination part 117 returns the processing to step S011 and repeats step S011 to step S015.

In the meantime, if an appropriate step has been performed to each of the character strings is determined to have been performed (Yes in step S017), the determination part 117 terminates the processing of integrating revision histories illustrated in FIG. 3.

As explained above, the CPU 110 of the computer 100 according to this embodiment includes the editor's name convert part 114 and the deletion part 118. The editor's name convert part 114 collectively converts a name of an editor to be changed in editing histories of a document data, after the editing is finished. After the name of the editor is appropriately converted, the deletion part 118 deletes both editing histories edited by an addition and a deletion made to the same character string by the same editor.

This makes it possible to clear the incompatible editing operations to the same portion by the same editor, thus allowing to simplify a plurality of editing histories in the document data.

<Variation 1>

In the above-described embodiment, the CPU 110 of the computer 100 performs various processings. The embodiment is not, however, limited to this. For example, in Variation 1, functions of the CPU 110 of the computer 100 are performed by an external server 200 connected via a network 300.

Figure 6:
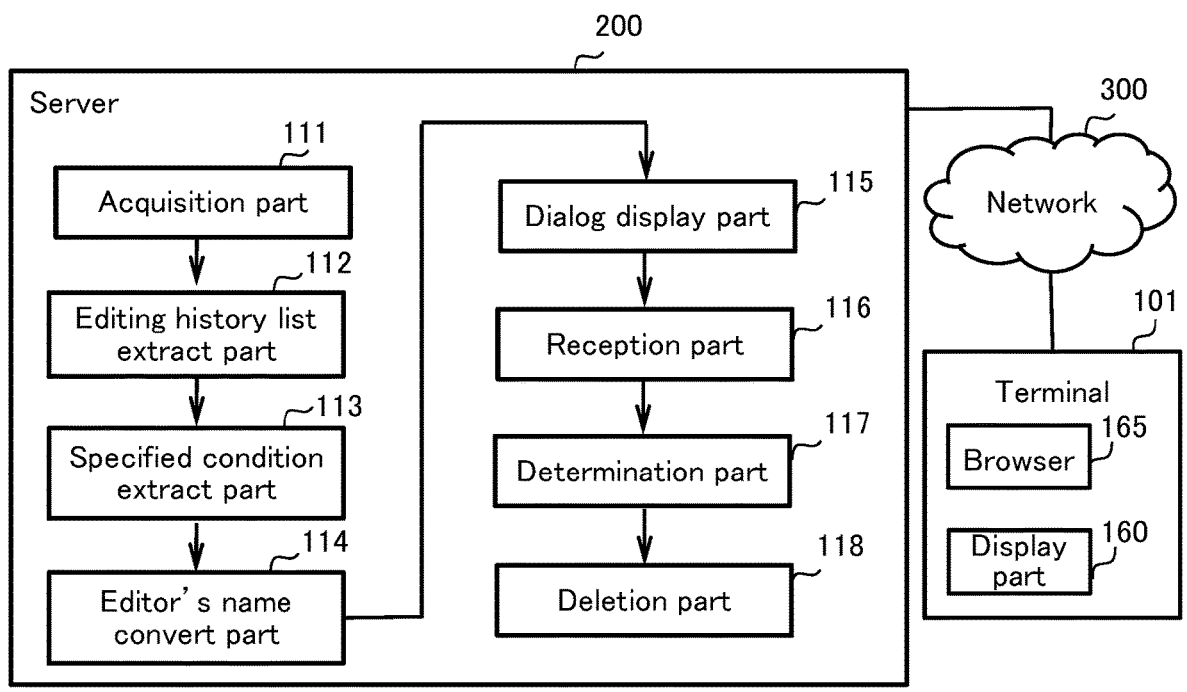
FIG. 6 is a block diagram illustrating a structure of a revision history integration system that includes a terminal and a server according to Variation 1 of the present invention.

FIG. 6 is a block diagram illustrating a structure of a revision history integration system that includes a terminal 101 and the server 200 according to Variation 1 of the present invention.

As illustrated in FIG. 6, in the revision history integration system according to Variation 1, the terminal 101 is connected to the network 300 via the server 200.

The terminal 101 includes the display part 160 and a browser 165. The browser 165 is constituted of one or more appropriate programs and has a function of making the display part 160 illustrated in FIG. 2 display an appropriate data.

The server 200 includes the acquisition part 111, the editing history list extract part 112, the specified condition extract part 113, the editor's name convert part 114, the dialog display part 115, the reception part 116, the determination part 117, the and the deletion part 118, as illustrated in FIG. 2.

The revision history integration system thus includes the server 200 including: the editor's name convert part 114 that converts a name of an editor to be changed in editing histories of a document data, after the editing is finished; and the deletion part 118 that, after the name of the editor is changed, deletes both editing histories edited by an addition and a deletion made to the same character string by the same editor.

The revision history integration system according to Variation 1 can clear incompatible editing operations by means of SaaS (Software as a Service) using the server 200. This can simplify a plurality of editing histories in data on a document.

<Variation 2>

Figure 7:
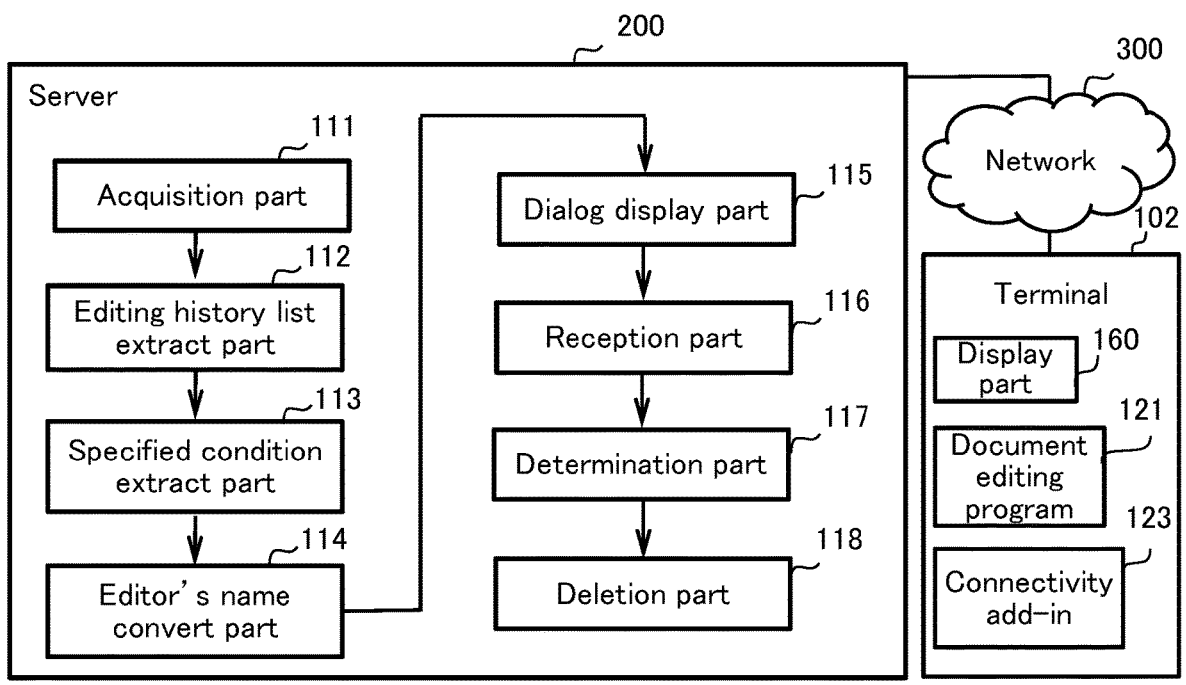
FIG. 7 is a block diagram illustrating a structure of a revision history integration system that includes a terminal and a server according to Variation 2 of the present invention.

FIG. 7 is a block diagram illustrating a structure of a revision history integration system that includes the terminal 102 and the server 200 according to Variation 2.

As illustrated in FIG. 7, the revision history integration system Variation 2 includes the terminal 102 which is connected to the server 200 via the network 300.

The terminal 102 includes the display part 160, the document editing program 121, and a connectivity add-in 123. The connectivity add-in 123 is constituted of an appropriate program and has a function of making the terminal 102 connected to the server 200.

The connectivity add-in 123 can thus executes the document editing program 121 and makes the terminal 102 connected to the server 200.

Thus, the revision history integration system according to Variation 2 can clear incompatible editing operations by means of the server 200 that executes the document editing program 121 and is connected by the connectivity add-in 123. This can simplify a plurality of editing histories in data on a document.

DESCRIPTION OF REFERENCE NUMERALS 100 computer
101, 102 terminal
110 CPU
111 acquisition part
112 editing history list extract part
113 specified condition extract part
114 editor's name convert part
115 dialog display part
116 reception part
117 determination part
118 deletion part
120 storage part
121 document editing program
122 editor's name convert add-in
123 connectivity add-in
130 ROM
140 RAM
150 operation part
160 display part
161, 162 display screen
165 browser
171 window
172, 173 combo box
174 editor's name add link
175 text box
176 execute button
181 dialog box
182, 183 character string
184, 185 delete button
200 server
300 network

The invention claimed is:

1. A non-transitory computer readable medium with an executable program causing at least one computer to execute:
   an integrated revision history program comprising an editor name conversion add-in program, the editor name conversion add-in program comprising:
   an acquisition program acquiring data on at least one document having editing histories derived from an editor performing editing on the at least one document, each of the editing histories including a name of the editor performing the editing, the editing histories of the at least one document including addition histories and deletion histories of the at least one document;
   an editor name conversion program modifying document revision histories, the editor name conversion program comprising:
      a first program function collectively converting the name of the editor included in at least one of the editing histories in the acquired data into at least one different name associated with the editor responsive to a selection by a user, and
      a second program function integrating the document revision histories of the name and the at least one different name; and
      a deletion program deleting any of the addition and deletion histories in the acquired data where a character string in the acquired data has been added and deleted by the editor as a result of the collective converting and the integrating associated with the name of the editor and the at least one different name of the editor; and
   a terminal comprising a connectivity add-in program implementing a document editing program, the document editing program of the terminal operably connecting with the integrated revision history program in the server via a network, the document editing program of the terminal operating in conjunction with the editor name conversion add-in program of the integrated revision history program in the server enabling interaction between the programs through the network and display of the terminal.

2. The non-transitory computer readable medium with the executable program according to claim 1, the revision history integration program further causing the computer to execute:
   a procedure for extracting at least one of the editing histories in the acquired data satisfying a condition specified by the user; and
   a procedure for collectively converting the name of the editor included in the at least one of the extracted editing histories to the at least one different name.

3. A system, comprising:
a server implementing an integrated revision history program with an editor name conversion add-in program, the server implementing:
an acquisition program acquiring data on at least one document having editing histories derived from an editor performing editing on the at least one document, each of the editing histories including a name of the editor performing the editing, the editing histories of the at least one document including addition histories and deletion histories of the at least one document;
an editor name conversion program modifying document revision histories, the editor name conversion program comprising:
- a first program function collectively converting the name of the editor included in at least one of the editing histories in the acquired data into at least one different name associated with the editor responsive to a selection by a user, and
- a second program function integrating the document revision histories of the name and the at least one different name; and
- a deletion program deleting any of the addition and deletion histories in the acquired data where a character string in the acquired data has been added and deleted by the editor as a result of the collective converting and the integrating associated with the name of the editor and the at least one different name of the editor; and
- a terminal comprising a connectivity add-in program implementing a document editing program, the document editing program of the terminal operably connecting to the server comprising the integrated history program via a network, the document editing program of the terminal operating in conjunction with the editor name conversion add-in program of the integrated revision history program enabling interaction between the programs through the network and display of the terminal.

4. The system according to claim 3, wherein the server further includes:
an editing history extract part configured to extract at least one of the editing histories in the acquired data satisfying a condition specified by the user; and
a convert part configured to collectively convert the name of the editor included in the at least one of the extracted editing histories to the at least one different name.

5. A system, comprising:
a server implementing an integrated revision history program with an editor name conversion add-in program, the server implementing:
an acquisition program acquiring data on at least one document having editing histories derived from an editor performing editing on the at least one document, each of the editing histories including a name of the editor performing the editing, the editing histories of the at least one document including addition histories and deletion histories of the at least one document;
an editor name conversion program modifying document revision histories, the editor name conversion program comprising:
- a first program function collectively converting the name of the editor included in at least one of the editing histories in the acquired data into at least one different name associated with the editor responsive to a selection by a user, and
- a second program function integrating the document revision histories of the name and the at least one different name; and
a deletion program deleting any of the addition and deletion histories in the acquired data where a character string in the acquired data has been added and deleted by the editor as a result of the collective converting and the integrating associated with the name of the editor and the at least one different name of the editor; and
a terminal comprising a browser enabling display of the integrated revision histories in a display and comprising a connectivity add-in program implementing a document editing program, the document editing program of the terminal operably connecting to the server comprising the integrated history program via a network, the document editing program of the terminal operating in conjunction with the editor name conversion add-in program of the integrated revision history program enabling interaction between the programs through the network, the browser, and the display of the terminal.

6. The system according to claim 5, wherein the server further includes:
an editing history extract part configured to extract at least one of the editing histories in the acquired data satisfying a condition specified by the user; and
a convert part configured to collectively convert the name of the editor included in the at least one of the extracted editing histories to the at least one different name.

* * * * *